Sept. 22, 1970  D. R. TREFFEISEN ET AL  3,530,465
OBSTACLE CLEARANCE SYSTEM FOR AIRCRAFT
Filed July 10, 1957  5 Sheets-Sheet 1

INVENTORS
DONAL R. TREFFEISEN
JOSEPH E. ZURANICK
BY
ATTORNEY

Sept. 22, 1970     D. R. TREFFEISEN ET AL     3,530,465
OBSTACLE CLEARANCE SYSTEM FOR AIRCRAFT
Filed July 10, 1957     5 Sheets-Sheet 4
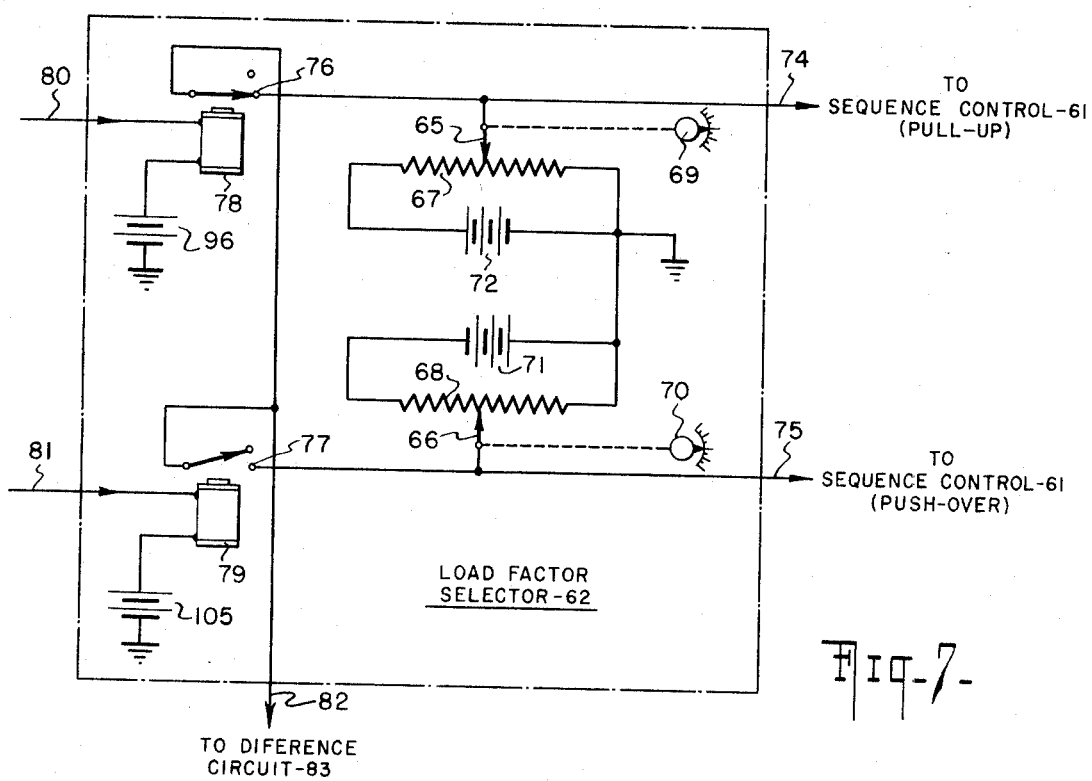
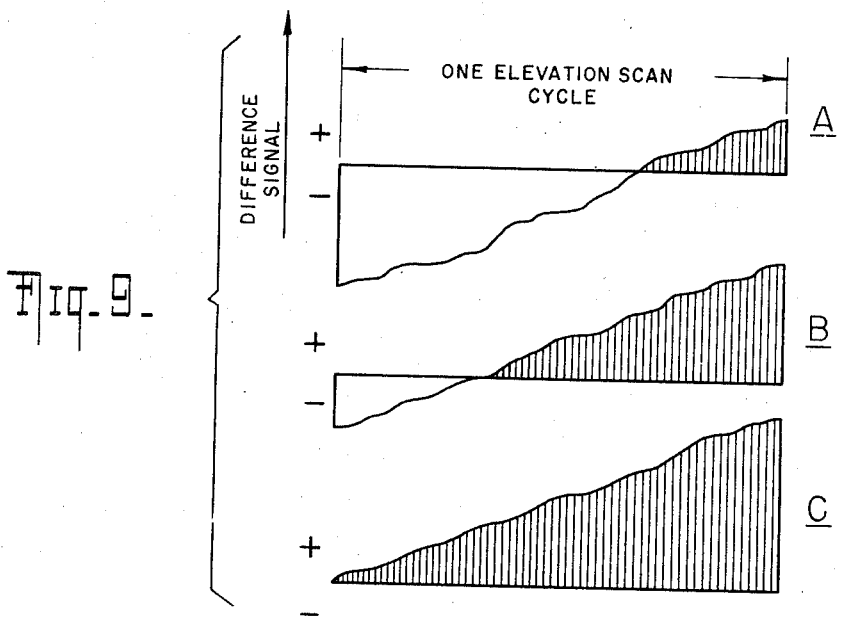
INVENTORS
DONAL R. TREFFEISEN
JOSEPH E. ZUPANICK
BY
R. J. Craddock
ATTORNEY

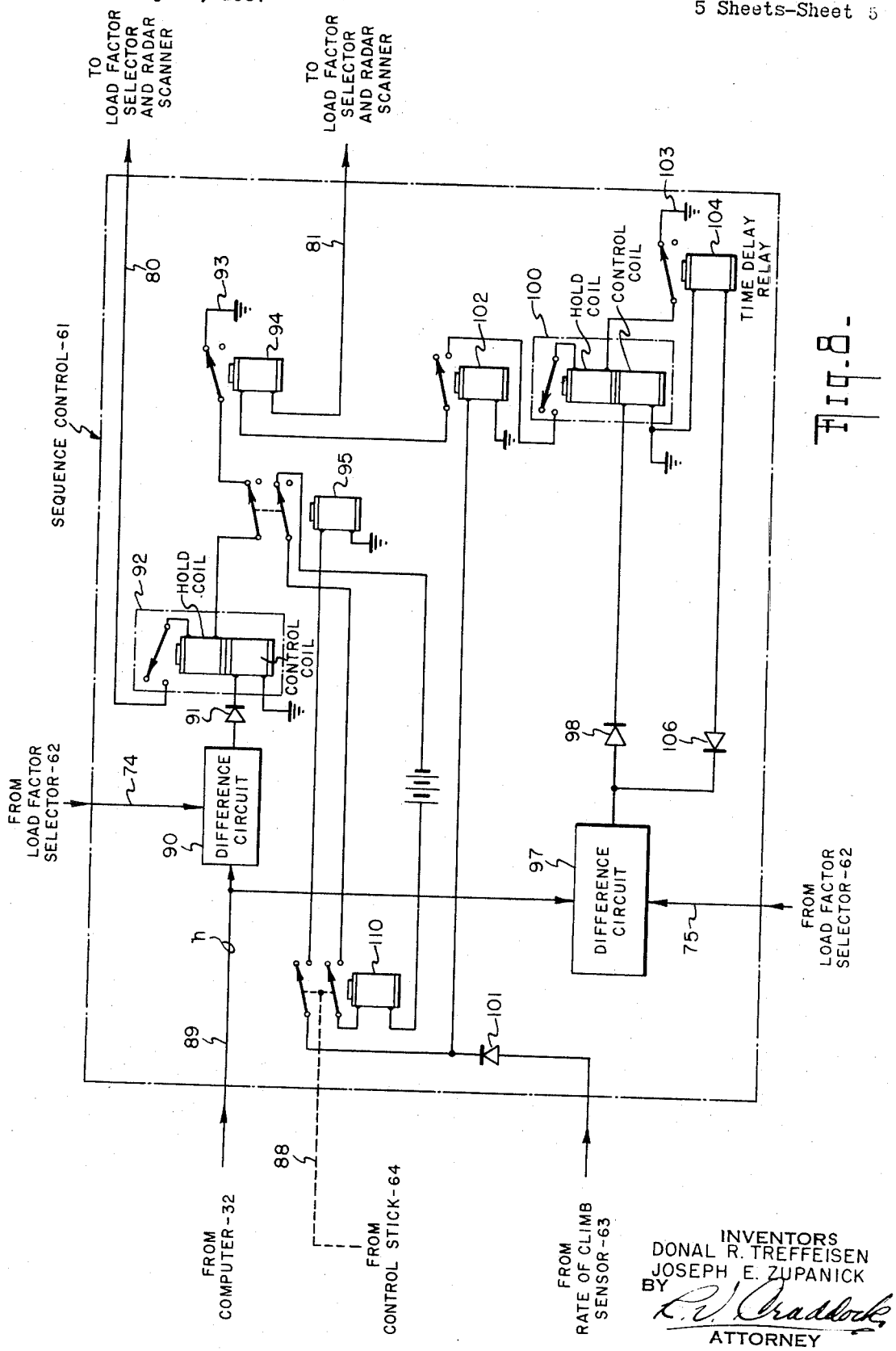

United States Patent Office 3,530,465
Patented Sept. 22, 1970

3,530,465
OBSTACLE CLEARANCE SYSTEM
FOR AIRCRAFT
Donal R. Treffeisen, Glen Cove, and Joseph E. Zupanick, Westbury, N.Y., assignors to Sperry Rand Corporation, a corporation of Delaware
Filed July 10, 1957, Ser. No. 672,537
Int. Cl. G01s 9/02
U.S. Cl. 343—7   15 Claims The invention herein described was made in the course of or under a contract or subcontract thereunder, with the Department of the Air Force.

The present invention relates generally to aircraft guidance systems and, more particularly, to such systems producing command signals for obstacle avoidance maneuvering.

The various systems which have been proposed in the prior art are generally concerned with merely avoiding an obstacle without any particular attention being directed toward the distance at which the obstacle is to be cleared. Particularly in military situations, however, it may be desirable that the maneuvering aircraft be flown as close to the obstacle as is compatible with safety considerations. For example, it may be desirable for tactical reasons that an aircraft navigate between its point of origin and its destination while maintaining some minimum altitude for purposes of avoiding enemy radar detection. As is well understood in the radar art, the problem of airborne target detectability is greatly increased when the target aircraft is flown at low altitudes above the passing terrain.

Accordingly, it is a principal object of the present invention to provide an aircraft guidance system for clearing obstacles by the execution of a minimum clearance maneuver.

Another object is to provide an aircraft guidance system for producing a command signal during the course of low altitude flight for initiating a predetermined maneuver at a late point in time while still permitting safe avoidance of the obstacle.

A further object is to provide an aircraft guidance system including a computer adapted to receive radar and aerodynamic input data for producing a command signal at a point in time when a predetermined load factor maneuver must be initiated in order to safely clear a critical obstacle.

An additional object is to provide an obstacle avoidance system for aircraft for signaling the time at which a maneuver is to be executed in a vertical plane for safely avoiding obstacles while maintaining minimum spacial clearance with respect thereto.

Yet another object is to provide an aircraft command signal generator for sequentially initiating upward maneuvers and then initiating and terminating to zero flight path angle the upward maneuvers of an aircraft for avoiding an obstacle along its path of travel with minimum clearance.

A further object is to provide means for initiating, executing, and terminating an aircraft terrain clearance maneuver which subjects the aircraft to a predetermined load factor.

Another object is to provide means for signaling to an aircraft pilot that a descending maneuver may be safely initiated.

These and other objects of the present invention, as will appear upon a reading of the following specification, are achieved by the provision of apparatus including a computer adapted to receive obstacle range and elevation data from an airborne scanning radar. Aerodynamic data are also supplied to the computer for the solution of an equation determining the load factor to which the aircraft would be subjected in avoiding the most critical portion of an approaching obstacle. The computer produces an output signal having a characteristic proportional to the aforesaid computed load factor, which load factor increases as the aircraft approaches the obstacle.

The computed load factor signal is then compared with a signal representing a predetermined load factor and upon the equality of the two, a command signal is applied to the aircraft elevator control servo. The applied command signal is of such characteristic that a maneuver which subjects the aircraft to a constant load factor will be executed in response thereto.

Thus, as the aircraft approaches the obstacle and that point in time is reached when a predetermined load factor maneuver must be initiated in order to clear the obstacle, the aircraft will initiate and execute such a pull-up maneuver in response to the command signal. Immediately upon the initiation of the aforesaid maneuver, the aircraft scanning radar mode of operation is abruptly switched so that it seeks obstacles which lie below the aircraft velocity vector axis where as said scanning radar had previously been engaged in the detection of obstacles lying above said vector.

In general, a maneuver producing a different load factor will be called for when clearing the summit of the approaching obstacle than was the case in the execution of the pull-up maneuver. As before, however, the predetermined summit clearing load factor is compared with the continuously computed one and a predetermined clearance load factor command signal is applied to the aforesaid elevator control servo when the computed and the predetermined load factor signals are equal.

Immediately upon the initiation of the summit clearance maneuver, the airborne scanning radar reverts to its initial mode wherein obstacles lying above the aircraft velocity vector again are investigated. Assuming that no obstacles then are detected above the velocity vector, the summit clearance maneuver will continue until the aircraft assumes a horizontal line of flight at which time the command signal is terminated and the horizontal flight path is maintained until the next obstacle is detected. However, the apparatus of the present invention produces a signal indicating that the human pilot may at his discretion safely maneuver the aircraft to a lower altitude as dictated by enemy radar detection avoidance considerations. As a safety precaution, means are provided to preclude the automatic application of a negative or descending flight path angle command signal.

For a more complete understanding of the present invention, reference should be had to the following specification and the appended drawings of which:

FIG. 7 is a schematic diagram of an illustrative load factor selector for use in the apparatus of FIG. 3;

FIG. 8 is a schematic diagram of a suitable sequence control for use in the apparatus of FIG. 3; and FIG. 9 is a series of diagrams useful in explaining the operation of the apparatus of FIG. 8.

Figure 1:
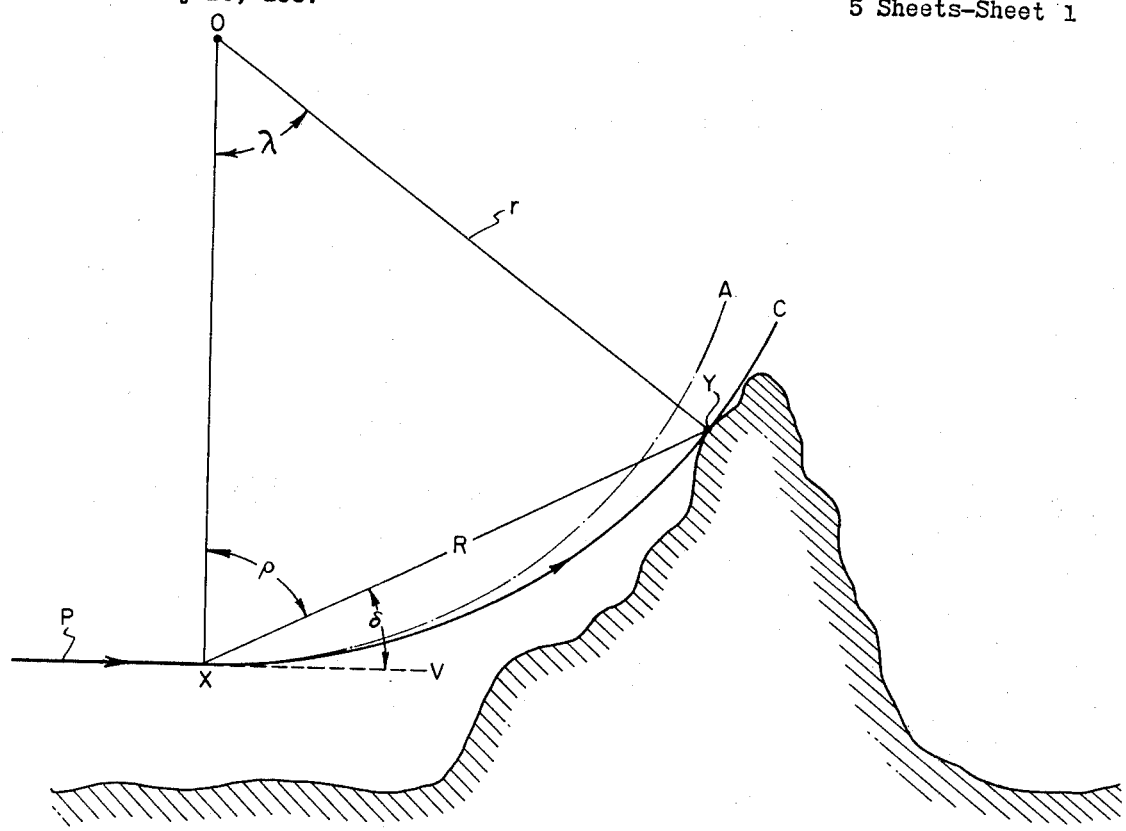
FIG. 1 is a representation of the geometrical parameters on which the equation solved by the computer of the present invention is based.

The following geometrical relationships obtain in FIG. 1:

$$\frac{r}{\sin \rho} = \frac{R}{\sin \lambda} \quad (1)$$

$$\rho = 90° - \sigma \quad (2)$$

$$\sin \lambda = \sin 2\sigma \quad (3)$$

where $r$ is the radius of circular path C;
$\lambda$ is the apex angle of isosceles triangle O, X, Y;
$\rho$ is the base angle of triangle O, X, Y;
$R$ is the base of triangle O, X, Y; and
$\sigma$ is the elevation angle of point Y on the obstacle relative to the aircraft velocity vector V.

Combining Equations 1, 2, and 3, there results $$r = \frac{R}{2 \sin \sigma} \quad (4)$$

It can be shown that the radius of a flight path traversed in a vertical plane is governed by the following expression:

$$r = \frac{V^2 \cos \gamma}{g(n-1)} \quad (5)$$

where $n$ is the ratio of aircraft lift to aircraft weight and is equivalent to the acceleration in $g$ applied to the aircraft;
$V$ is the velocity of the aircraft;
$\gamma$ is the flight path angle of the aircraft; and
$g$ is the well known gravitational constant.

In FIG. 1, it is assumed that the aircraft moves along flight path P and arrives at point X, at which an obstacle clearance maneuver in a vertical plane is to be initiated. It is further assumed that the aircraft carries radar detection apparatus whose antenna is spacially stabilized along the aircraft velocity vector. According to the present invention, the aircraft executes a constant load factor maneuver upon its arrival at point X along flight path P. By inspection of Equation 5, it will be seen that such constant load factor path maneuver will follow a circular path C of constant radius $r$ with respect to origin O if the velocity of the aircraft remains constant. Inasmuch as the velocity of the aircraft diminishes, subsequent to the initiation of a pull-up maneuver, the actual path traveled by the maneuvering aircraft will be that designated by the dotted line A having continuously decreasing radii relative to origin O. In this way, an inherent safety margin for clearance is provided.

Substituting Equation 4 into Equation 5, there results $$n - 1 = \frac{2V^2 \cos \gamma \sin \sigma}{gR} \quad (6)$$

The apparatus of the present invention operates to continuously compute the value of load factor $n$, defined by Equation 6, as the aircraft travels along flight path P toward an obstacle. It will be observed that point Y, not necessarily at the summit, is the critical point of the obstacle to be safely cleared.

Figure 2:
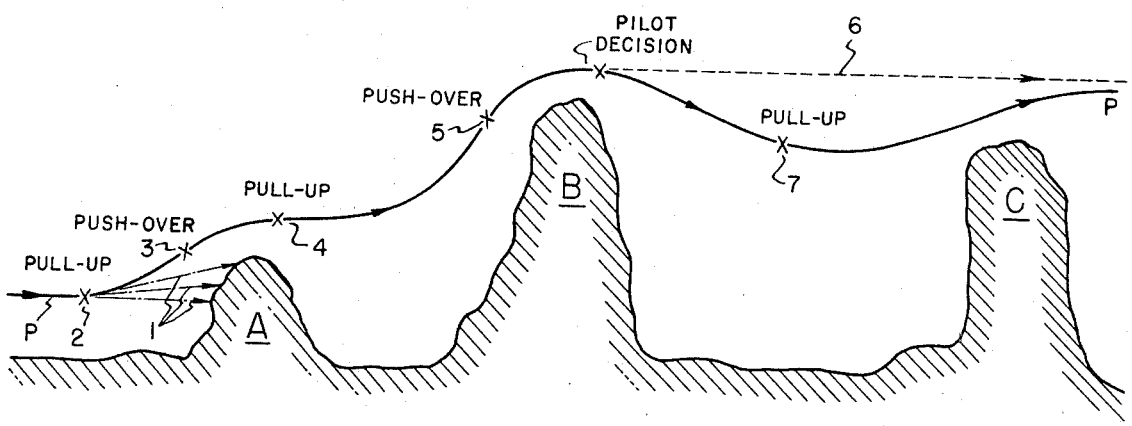
FIG. 2 is an elevation view of representative terrain obstacles showing the travel path of an aircraft guided by the apparatus of the present invention.

The operation of the system of the present invention may be seen upon examination of FIG. 2. In FIG. 2, it is assumed that the aircraft is flying along path P toward obstacle A. Dotted lines 1 represent the successive positions of the airborne radar beam as it scans in a vertical plane above the aircraft velocity vector to continuously produce range and elevation angle information respecting the component radar targets comprising obstacle A. Said radar information, together with separately derived aerodynamic data, is fed to an airborne computer for the calculation of the load factor required to clear obstacle A as the aircraft approaches obstacle A along path P.

When the aircraft arrives at point 2, the computed load factor reaches a predetermined critical value whereupon a command signal is produced calling for a constant load factor pull-up maneuver. The maneuver actually executed by the aircraft is represented by dotted curve A of FIG. 1. During the course of the maneuver, a commanded constant load factor as previously selected by the pilot is compared with a monitored actual load factor in the aircraft vertical control-surface servo system.

Upon the initiation of the pull-up maneuver at point 2, the radar scanning apparatus previously investigating targets lying above the aircraft velocity vector, is switched to a second mode of operation wherein targets lying below said vector are detected. Range and negative elevation angle information is again applied to the airborne computer together with certain aerodynamic data for the computation of the negative load factor maneuver required to safely negotiate the summit of obstacle A. When the summit-clearing maneuver load factor reaches equality with a predetermined negative load factor, a second command signal is produced whereupon the aircraft enters into its "push-over" mode of operation, as indicated at point 3 along path P. In this mode, the velocity of the aircraft increases due to its decreasing pitch attitude. Consequently, the curvature of the flight path decreases and again a clearance safety margin is provided.

Immediately upon the initiation of the push-over maneuver at point 3, the airborne scanning radar operation is restored to its initial mode wherein targets lying above the aircraft velocity vector are detected. In other words, during the time that the push-over maneuver is being carried out, the airborne radar is on the alert to detect additional further obstacles, such as obstacle B, the appearance of which would demand a second pull-up maneuver.

The airborne computer is engaged with the computation of the pull-up load factor maneuver during the time that the aircraft is completing its push-over. Thus, at point 4 along path B, a second pull-up maneuver is commanded because of the presence of obstacle B.

In a fashion similar to that described with obstacle A, a push-over maneuver is initiated at point 5 along path P immediately following which the airborne computer is again engaged in computation of pull-up load factors. In the case of the clearance of obstacle B, however, no further obstacles are detected by the airborne radar, obstacle C lying beneath the velocity vector of the maneuvering aircraft. Therefore, the "push-over" maneuver is in this case completed, i.e., push-over continues until the aircraft assumes a horizontal line of flight whereupon the maneuver is discontinued and a signal is presented to the pilot. The signal indicates that the pilot may now at his discretion execute a descending push-over maneuver so as to return the aircraft to a predetermined minimum terrain clearance altitude, as dictated by enemy radar considerations.

Should the pilot decide not to execute a push-over maneuver, the aircraft will continue along its horizontal line of flight, as indicated by dotted line 6. Assuming, however, that such a maneuver is ordered by the pilot, the aircraft will continue along path P toward the aforementioned minimum altitude until it arrives at point 7, at which time a pull-up maneuver will be ordered because of the presence of obstacle C.

Figure 3:
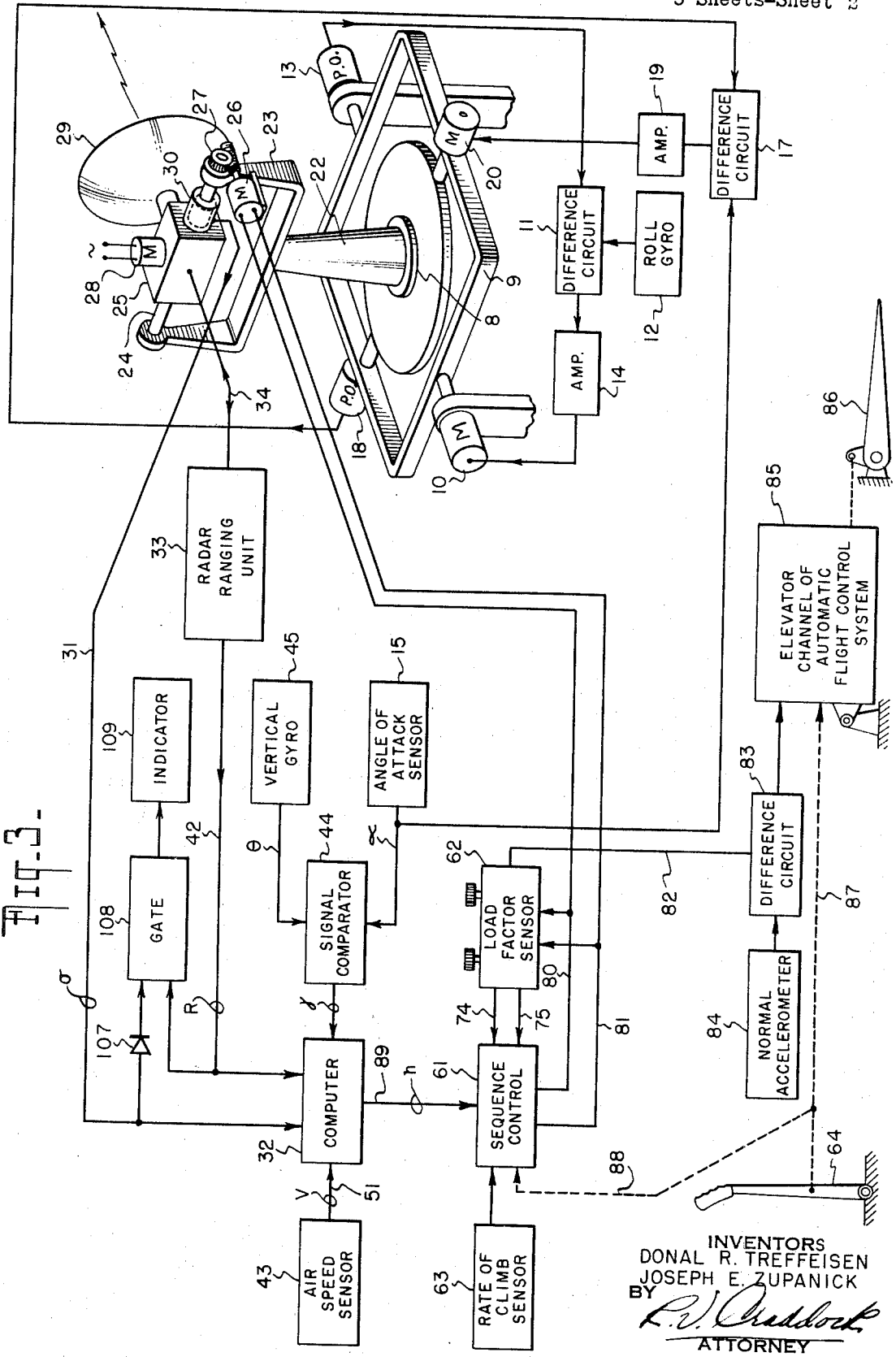
FIG. 3 is a simplified block diagram of an automatic embodiment of the present invention.

A simplified block diagram of an automatic embodiment of the present invention is shown in FIG. 3. As previously mentioned, the required radar-derived target elevation data is referenced to the aircraft velocity vector. Accordingly, means are provided in FIG. 3 for stabilizing a radar antenna support-base in space along the velocity vector. Base 8 is stabilized against the roll of the aircraft by means of a conventional gimbal arrangement 9. Gimbal 9 is driven by motor 10 in response to an error signal derived from difference circuit 11 having two inputs, one of which is obtained from roll gyro 12 and the other of which is derived from pick-off 13. The error signal at the output of circuit 11 is amplified by amplifier 14 and applied to the control field of motor 10.

The other axis of base 8 is stabilized along the aircraft velocity vector in response to an electrical signal derived from an angle of attack sensor 15 and applied via line 16 to difference circuit 17. Circuit 17 provides an output voltage proportional to the difference in amplitude between the aforesaid signal on line 16 and the output signal of pick-off 18. The difference signal is amplified by amplifier 19 and applied to the control field of motor 20 to position the second axis of base 8. Pick-off 18 produces an output signal proportional to the angle between base 8 and the longitudinal axis of the aircraft. When said angle is made equal to $\alpha$, the angle of attack, then the second axis of base 8 is aligned along the aircraft velocity vector.

An antenna pedestal 22 supports yoke 23 in turn securing rotatable shaft 24. Antenna scanner 25 is positioned around the axis of shaft 24 in accordance with the displacement of the shaft of motor 26 which drives shaft 24 via screw gearing 27. Motor 28 imparts a conventional oscillatory scanning motion to antenna 29. The central axis about which antenna 29 is scanned is determined by the position of the output shaft of motor 26. The angle between the axis of antenna 29 and the velocity vector axis of base 8 is monitored by pick-off 30 and is applied via line 31 to a first input of computer 32.

Radar ranging unit 33 is coupled via microwave line 34 to antenna 29. Unit 33 produces an output voltage whose instantaneous amplitudes are proportional to the ranges at which respective reflecting targets appear for a given elevation angle position of antenna 29. As will more clearly be seen in the following, unit 33 is preferably adapted to produce output signals having amplitudes each of which represents the range of respective reflecting targets within a radar repetition interval. Thus, the output voltage from unit 33 must rapidly follow the different ranges of targets lying within the radar beam along a given elevation angle, the ranges being represented by the time separation between the radar system trigger and the occurrence of target video pulses.

Figure 4:
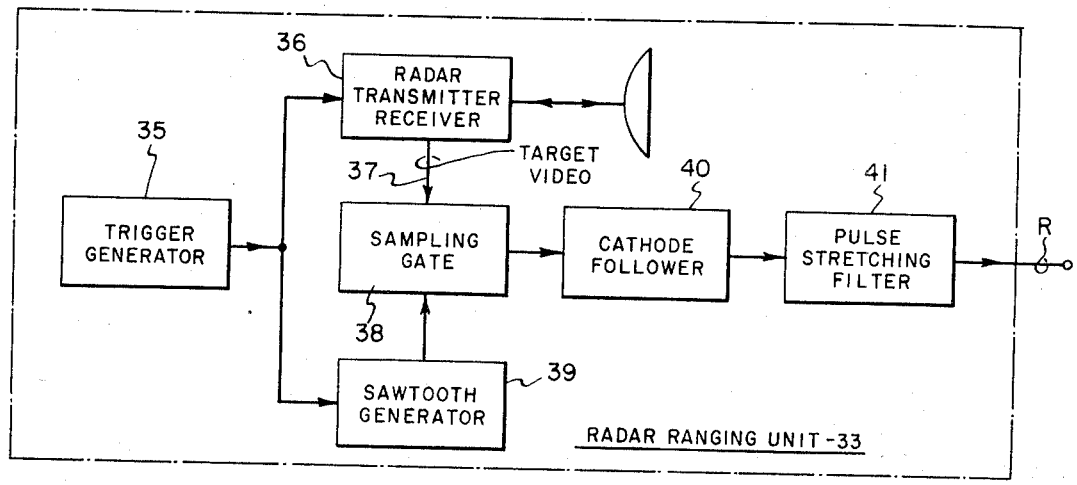
FIG. 4 is a block diagram of an illustrative embodiment of the radar ranging unit of FIG. 3.

An illustrative embodiment of unit 33 may include the apparatus shown in FIG. 4 wherein trigger generator 35 produces output pulses for simultaneous application to radar transmitter-receiver 36 and sawtooth generator 39. Transmitter-receiver 36 produces output target video pulses on line 37, which pulses activate sampling gate 38 having a second input derived from synchronized sawtooth generator 39. There is produced at the output of gate 38 a succession of short pulses, each corresponding to a respective target video pulse, and each having an amplitude proportional to the time at which said respective target pulses occur relative to the occurrence of the corresponding trigger pulses. The output pulses from gate 38 are applied by a cathode follower 40 to pulse stretching filter 41. Filter 41 may include a capacitor as part of a network having a short charge time constant but a relatively long discharge time constant. The low output impedance of cathode follower 40 provides for the short charge time constant while the higher impedance seen at the output of filter 41 produces the required long discharge time constant. Stretching filter 41 may be of the form of conventional box car detector producing an output wave of a "staircase" shape, as the result of the ability of the capacitor included therein, to quickly follow changes in input pulse voltage amplitudes in either direction.

Figure 5:
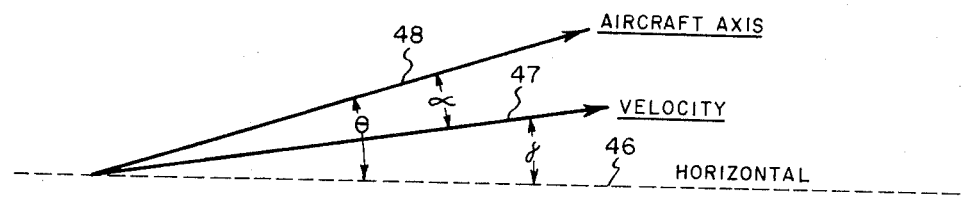
FIG. 5 shows the relationship between the angular data required for the computer of the present invention.

Returning to FIG. 3, the output of unit 33, representing the ranges of reflecting targets, is supplied via line 42 to a second input to computer 32. A third input to computer 32 is obtained from airspeed sensor 43; a fourth input thereto is obtained from the output of signal comparator 44. Although sensor 43 preferably is capable of sensing true aircraft speed, a tolerably small error is introduced into computer 32 for low altitude flight, if the true aircraft speed is very much greater than wind speed in which case an ordinary airspeed sensor is adequate. Signal comparator 44 is adapted to receive output signals from vertical gyro 45 and angle of attack sensor 15 and to produce an output voltage proportional to the difference between the two inputs. The significance of the input and output voltages of difference circuit 44 may be seen by reference to FIG. 5. In FIG. 5, dashed line 46 represents a horizontal plane, solid line 47 represents an assumed direction of the aircraft velocity vector while solid line 48 designates the direction of the longitudinal axis of the aircraft. Pitch angle $\Theta$ is measured by vertical gyro 45. For the purpose of the present invention, the angle of attack $\alpha$ is defined as the angle between the longitudinal axis of the aircraft and the aircraft velocity vector and is measured by sensor 15. It is readily apparent that flight path angle $\gamma$ is obtained by subtracting $\alpha$ from $\Theta$.

Computer 32 is thus provided with four inputs respectively proportional to target (obstacle) range, target elevation angle (relative to the aircraft velocity vector), aircraft airspeed, and aircraft flight path angle for the solution of Equation 6. An illustrative embodiment of computer 32 is shown in FIG. 6.

Figure 6:
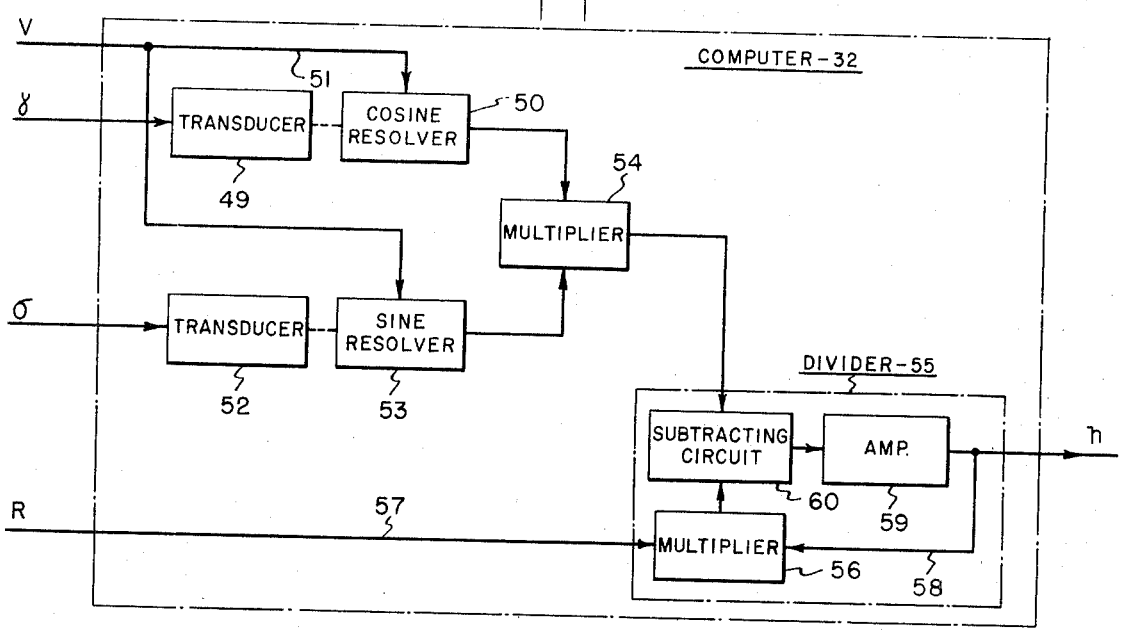
FIG. 6 is a block diagram of a representative embodiment of the computer of the present invention.

In FIG. 6, transducer 49 converts the electrical signal at the output of circuit 44, representing flight path angle $\gamma$, to an equivalent mechanical shaft displacement for the orientation of the rotor of cosine resolver 50. Resolver 50 obtains an electrical input via line 51 from the output of aircraft speed sensor 43. Transducer 52 is similarly adapted to convert the electrical signal, representing target elevation angle $\sigma$, to its mechanical shaft displacement equivalent for the positioning of the rotor of sine resolver 53. Resolver 53 also derives its electrical signal input from line 51. There are thus produced at the input of conventional multiplier 54 two signals proportional to $V \cos \gamma$ and $V \sin \sigma$, respectively.

The output of multiplier 54 is supplied to a first input of divider 55, containing within it multiplier 56 which is adapted to receive a signal on line 57 proportional to target range, and a signal on line 58 which is derived from the output of amplifier 59. Subtracter circuit 60 subtracts the signal at the output of multiplier 56 from the signal at the output of multiplier 54. Divider 55 is well understood in the art as adapting a multiplying circuit (such as multiplier 56) to achieve the function of division. Such an arrangement is disclosed on pages 668–669 of "Waveforms," edited by B. Chance et al. and published by the McGraw-Hill Book Company, 1949. Briefly, the signal produced at the output of amplifier 59 is proportional to the quotient obtained by dividing the output signal of multiplier 54 by the signal appearing on line 57. Thus, the apparatus of FIG. 6 operates to produce an output $n$ representing load factor as previously described in connection with Equation 6. The constant terms contained in Equation 6 may be taken into account by conventional circuit design techniques.

Transducers 49 and 52, resolvers 50 and 53, multiplier 54, subtracter circuit 60, and amplifier 59 may take the form of any one of a number of circuits recognized in the art for accomplishing the indicated purposes. It will be observed, however, that multiplier 56, included within divider 55, must be adapted to operate at relatively high rates of speed in response to its corresponding rapidly changing range data signal. Although the choice of prior art devices for use in multiplier 56 is not so broad as is the case with multiplier 54, numerous suitable multipliers are available. One example of a suitable high speed analog multiplier is described by W. A. McCool in the Proceedings of the IRE, volume 41, pages 1470–1476, October 1953, in an article entitled "An AM–FM Electronic Analog Multiplier."

Returning to FIG. 3, the output signal of computer 32, representing load factor $n$, is applied to the first input of sequence control 61, four additional inputs to which are derived from load factor selector 62, rate-of-climb sensor 63, and pilot control stick 64. A representative embodiment of load factor selector 62 is shown in FIG. 7. As was previously discussed, in the present invention a continuously computed clearance load factor is compared with a predetermined load factor and a maneuver command signal is produced upon the equality of the two. In general, two separate predetermined load factors are required, respectively, for the pull-up maneuver and the push-over maneuver described in connection with FIG. 2. The predetermined load factor reference signals are produced in FIG. 7 by adjustment of the sliders 65 and 66 of potentiometers 67 and 68, respectively. Control knobs 69 and 70 represent manual means for accomplishing such adjustment. Potentiometer 68 is energized by source 71 while potentiometer 67 is energized by source 72.

The potentials at the sliders of potentiometers 67 and 68 are continuously available on lines 74 and 75 for application to sequence control 61 of FIG. 3. Lines 74 and 75 are also connected to contacts 76 and 77 of relays 78 and 79, respectively, which relays are energized in response to output signals produced by sequence control 61, which appear on lines 80 and 81. As will be seen more clearly in the following description of the operation of sequence control 61, a signal appears on line 80 in the event that the computer of the present invention is engaged in the computation of pull-up load factors; line 81 is energized in the case of push-over load factor computation.

In FIG. 7, relay 78 is shown energized while relay 79 is de-energized, thus indicating a pull-up computation mode of operation. A predetermined pull-up load factor signal, appearing on line 74, is then made available via the contacts of energized relay 78 to line 82. It can be seen that in the push-over computation mode of operation, the push-over load factor signal available on line 75 is applied via the contacts of the then energized relay 79 to the same output line 82.

Returning again to FIG. 3, the output on line 82 of selector 62 is applied to first input of difference circuit 83, a second input to which is derived from normal accelerometer 84. Accelerometer 84 produces a signal whose amplitude is proportional to that component of aircraft acceleration which is perpendicular to both the longitudinal axis and the pitch axis of the aircraft. Thus, accelerometer 84 monitors the actual normal load factor on the maneuvering aircraft. Difference circuit 83 compares the commanded load factor signal appearing on line 82 with the actual load factor signal produced by accelerometer 84. The difference signal output from circuit 83 is applied to the elevator channel of the automatic flight control system (A.F.C.S.) 85. A.F.C.S. 85 is adapted to receive a second input in the form of the displacement of shaft 87 which is moved in conformance with the operation of control stick 64. A suitable system is shown in U.S. Pat. No. 2,678,177 issued to P. J. Chenery et al. on May 11, 1954, and assigned to the present assignee. A.F.C.S. 85 operates to position aircraft elevator 86 in a direction and magnitude proportional to the sense and amplitude of the difference signal output from circuit 83. The control of elevator 86 is also governed by an over-riding manual signal as may be applied via shaft 87 which is linked to control stick 64. Shaft 87 is also coupled via mechanical linkage means 88 to sequence control 61.

The structure of an illustrative embodiment of sequence control 61 is shown in FIG. 8. The output of computer 32 of FIG. 3 is applied via line 89 of FIG. 8 to a first input of difference circuit 90; the second input thereto is obtained via output line 74 of the load factor selector 62 of FIG. 7. In circuit 90, the amplitude of the positive preselected load factor signal on line 74 is subtracted from the amplitude of the positive computed load factor signal on line 89. When the difference signal is positive, i.e., the signal on line 89 is greater than on line 74, diode 91 is rendered conductive thus energizing the control coil of relay 92. The normally open contacts of relay 92 then close to establish a direct current path from ground 93, through the normally closed contacts of relay 94, the normally closed contacts of relay 95, the hold coil of relay 92, line 80 of FIGS. 8 and 7, relay 78 of FIG. 7, and D-C source 96 of FIG. 7, thus simultaneously energizing the hold coil of relay 92 (maintaining the contacts thereof closed) and energizing relay 78 of FIG. 7. The contacts of relay 78 of FIG. 7 are shown in the closed or actuated condition. Upon the operation of relay 78, the pull-up positive load factor signal, available on the slider 65 of potentiometer 67, is applied to line 82 and thence to the reference signal input to difference circuit 83 of FIG. 3.

The signal produced on line 80 of FIG. 8 upon the operation of relay 92 is also applied to the first input of reversible motor 26 of FIG. 3. The appearance of a signal on line 80 causes the rotor of motor 26 to assume a predetermined displacement such that antenna 29 is caused to scan through angles all of which lie below the aircraft velocity vector to which one axis of base 8 is stabilized. Thus, upon the application of a positive pull-up reference signal to difference circuit 83 of FIG. 3, antenna 29 is commanded to search for obstacles lying below the aircraft velocity vector in anticipation of a push-over maneuver.

Upon the initiation of the scanning of antenna 29 below the aircraft velocity vector, negative target elevation angle signals are applied to the input of computer 32, in turn producing computed negative load factor signals replacing the previous positive computed load factor signals on line 89, causing the cessation of conduction of diode 91 of FIG. 8. The contacts of relay 92 remain closed, however, because of the continued energization of the hold coil. A negative reference load factor signal, produced on line 75 of the load factor selector 62 of FIG. 7, is applied to a first input to difference circuit 97, the other input to which the computed negative load factor signals are applied. Circuit 97 operates to subtract the signal on line 89 from the signal on line 75.

It will be seen that for a given position of the aircraft along flight path P of FIG. 2, between points 2 and 3 thereon, the minimum negative load factor of all the component radar targets comprising obstacle A is that load factor required to clear the summit of obstacle A. Moreover, as the aircraft leaves point 2 and approaches point 3 of flight path P, said minimum summit negative load factor increases. The apparatus of sequence control 61 of FIG. 8 is operative to command a push-over maneuver in the event that all of the computed negative load factor signals are greater than a predetermined negative reference load factor signal.

There are plotted in FIG. 9 three separate sets of output signals from circuit 97 of FIG. 8 corresponding to three different positions of the approaching aircraft between points 2 and 3 along flight path P of FIG. 2. It is assumed in diagram A of FIG. 9 that the aircraft is at point 2 of FIG. 2. As the antenna scans those targets lying below the aircraft velocity vector, there is produced at the output of computer 32 of FIG. 3 a succession of signals whose amplitude is proportional to the magnitude of the load factor to which the maneuvering aircraft would be subjected to in order to safely clear the respective component targets. In general, those component targets of obstacle A of FIG. 2, lying increasingly below the aircraft velocity vector, will require higher (more negative) load factor maneuvers than would be required to clear the summit of obstacle A which lies only slightly below said vector. Accordingly, in diagram A of FIG. 9, the difference signal output of circuit 97 is seen to increase positively with increasing negative elevation angles.

As the aircraft leaves point 2 and assumes some intermediate position between points 2 and 3, all of the computed component target load factor signals will increase (becoming more negative) so that the average difference signal over a complete elevation scan of antenna 29 will become more positive as shown in diagram B. In diagram C, it is assumed that the aircraft has arrived at point 3 along flight path P whereat all the component amplitudes of the difference signal lie above the zero voltage reference axis. It is at this point that the push-over maneuver of the aircraft is to be commanded.

Referring to FIG. 8, diode 98 is rendered conductive when the difference signal output of circuit 97 is positive, and is cut off when said difference signal is negative. The difference signal output is positive when the computed negative load factor signal on line 89 is greater in magnitude than the negative reference load factor signal appearing on line 75 from which it is subtracted. Upon the conduction of diode 98, the control coil of relay 100 is energized causing its associated contacts to close. It will be recalled that the aircraft at this time is still engaged in the execution of its pull-up maneuver wherein the rate-of-climb of the aircraft, as monitored by sensor 63 of FIG. 3, is positive.

In the presence of a positive rate-of-climb signal, diode 101 is rendered conductive in turn energizing relay 102 whose normally open contacts are then closed. A conductive path is then provided from ground 103 through the normally closed contacts of relay 104, the hold coil and closed contacts of relay 100, the closed contacts of relay 102, the coil of relay 94, line 81 (of FIGS. 8 and 7), the coil of relay 79 of FIG. 7, the D-C source 105, and the ground of FIG. 7.

Upon the operation of relay 94, its normally closed contacts are opened whereupon the hold coil of relay 92 is de-energized in turn de-energizing relay 78 of FIG. 7 and discontinuing the application of the positive load factor reference signal via line 82 to difference circuit 83 of FIG. 3. Upon the operation of relay 79, however, the negative reference load factor signal is applied via closed contacts of relay 79 to line 82. Thus, the pull-up command signal applied to difference circuit 83 of FIG. 3 has been replaced by the push-over command signal.

As previously stated, however, it is desired that the aircraft initiate this push-over maneuver only when all of the computed negative load factor signals are greater (in a negative direction) than the amplitude of the negative reference load factor signal. How the apparatus of the present invention operates in such fashion can be seen by reference to the diagrams of FIG. 9. In diagram A, the shaded portion corresponds to the time when positive difference signals are produced at the output of circuit 97 whereupon diode 98 of FIG. 8 conducts. As discussed in the foregoing, such conduction of diode 98 would initiate a push-over maneuver. However, during the earlier part of the same scan cycle of antenna 29 of FIG. 3, the difference signal output of circuit 97 had been negative as shown in the unshaded portion of diagram A.

As the aircraft progressively approaches obstacle A of FIG. 2, as represented in diagrams B and C of FIG. 9, the time during which positive difference signal outputs of circuit 97 of FIG. 8 occur increases. During the time when negative difference signals are produced at the output of circuit 97, diode 106 is rendered conductive in turn energizing time delay relay 104. Upon the energization of relay 104 and the opening of its normally closed contacts, the holding coil of relay 100 is de-energized and relay 94 of FIG. 8 and relay 79 of FIG. 7 are de-energized. With the de-energization of relay 79, the push-over command signal is removed from line 82. The time delay of relay 104 is adjusted to be approximately equal to one-half the scan cycle interval of antenna 29, i.e., the contacts of relay 104 remain in their de-energized or opened condition for approximately one-half of antenna scanning period following the conduction of diode 106.

It can be seen, therefore, that a push-over maneuver is not commanded in the case of diagrams A and B of FIG. 9 for the reason that diode 106 conducts during at least a portion of each antenna scanning period. In the case of diagram C, however, only diode 98 is rendered conductive inasmuch as all of the difference outputs of circuit 97 are positive. In such a case, the push-over maneuver is finally commanded and continues to be executed until either the rate-of-climb signal becomes zero (whereupon relay 102 is de-energized) or in the event that the proximity of an approaching obstacle initiates a further pull-up maneuver.

In the event that no further obstacles are detected by the airborne radar, the push-over maneuver is continued until the aircraft assumes a level flight condition whereupon relay 102 is de-energized as previously mentioned. With the aircraft in level flight and the radar antenna scanning those angles lying above the aircraft velocity vector, the positive elevation angle signals will be passed by diode 107 of FIG. 3 and applied to first input of gate 108. The range signal output R of unit 33 is applied to a second input to gate 108 which is adapted to produce an output signal upon the occurrence of a positive elevation angle signal $\sigma$ (passed by diode 107) and in the absence of a range signal R. Upon the concurrence of these two signal conditions, the output signal of gate 108 energizes indicator 109 to alert the aircraft pilot that he may, at his discretion, initiate a descending maneuver so as to return the aircraft to the predetermined minimum terrain clearance altitude.

Assuming that the pilot commands such a descending manuever by displacement of control stick 64 of FIG. 3, the mechanical input 87 to elevator actuator 85 overrides any electrical control signal input from difference circuit 83 so as to initiate the descending maneuver. Simultaneously, mechanical linkage 88, connected to mechanical means 87, causes the momentary closure of the normally open contacts of relay 110 of FIG. 8. Upon the closure thereof, relay 110 is energized to maintain its contacts closed. The negative rate-of-climb signal produced during the execution of the pilot-commanded descending maneuver is blocked by non-conductive diode 101, thus preventing the energizing of relay 95.

As the aircraft continues to approach the terrain, with the computer in the pull-up mode of operation, a pull-up command will ultimately be initiated to clear the terrain. During the execution of such a pull-up maneuver, the rate-of-climb of the aircraft continuously decreases until it equals zero, and then starts to increase in positive direction. At such time, and assuming that no further vertical obstacle appears ahead of the aircraft, the positive rate-of-climb signal will be passed by diode 101 of FIG. 8 through the closed contacts of relay 110 and energized relay 95. As the normally closed contacts of relay 95 open, the hold coil circuit of pull-up relay 92 is de-energized removing the positive reference pull-up load factor signal from difference circuit 83 of FIG. 2, thus permitting the aircraft to assume a horizontal line of flight and to prevent the aircraft from continuing the execution of the pull-up maneuver which would otherwise result in the event that the hold coil of relay 92 remained arbitrarily energized.

Upon the operation of relay 95, and simultaneously with the interruption of the circuit energizing the hold coil of relay 92, the second pair of contacts of relay 95 open the holding circuit of relay 110. Upon the energization of relay 110, its contacts open in turn causing the de-energization of relay 95 whereupon the contacts of relay 95 revert to their normally closed (de-actuated) position so as to reset sequence control 61 in anticipation of the next following pull-up command signal.

It can be seen from the preceding specification that the objects of the present invention have been accomplished, in an illustrative automatic embodiment thereof, by the provision of a computer adapted to receive radar and aerodynamically-derived input data. In a first mode of operation, an airborne radar antenna is caused to scan through angles lying above the aircraft velocity vector in anticipation of a pull-up maneuver for clearing an oncoming obstacle by means of the execution of predetermined load factor maneuver in the vertical plane. The point at which the pull-up maneuver is to be executed is determined by a comparison of a preselected positive load factor reference signal with continuously computed positive load factor signals required to tangentially clear the component targets comprising the oncoming obstacle.

Upon the equality of the preselected reference load factor and continuously computed load factor signals, said reference load factor signal is applied to the aircraft elevator servo mechanism whereupon the pull-up maneuver is initiated.

Means are provided for monitoring that component of acceleration acting in a plane perpendicular to both the longitudinal axis and the pitch axis of the aircraft. The monitored normal acceleration signal is compared with the commanded preselected load factor signal in the aircraft elevator control system so as to maintain the preselected load factor maneuver during the execution thereof.

Upon the initiation of the pull-up maneuver, means are provided to cause the aircraft radar antenna immediately to scan those angles lying below the aircraft velocity vector in anticipation of a push-over maneuver. The time at which the push-over maneuver is to be begun is determined in a fashion similar to the computation of the pull-up point previously effected. Thus, negative computed load factor signals are continuously compared with a preselected negative reference load factor signal. Upon the equality of the two, said preselected negative load factor signal is applied to the aircraft elevator control system.

Maintenance of the negative load factor push-over maneuver is obtained by comparing the commanded maneuver signal with an actual load factor signal as monitored by an aircraft-borne normal accelerometer in a fashion similar to that prevailing during the pull-up maneuver.

During the execution of the push-over maneuver, the airborne antenna scanning apparatus responds to an applied signal causing the reversion of the antenna scanning mode to the original one wherein targets lying above the aircraft velocity vector are investigated in anticipation of a forthcoming pull-up maneuver.

In the presence of a further obstacle ahead of the aircraft, the apparatus of the present invention operates to command a second pull-up maneuver. In the absence of any such further obstacle, however, means are provided to detect the resumption of a horizontal line of flight of the aircraft whereupon an alert signal is presented to the pilot, signifying that he may, at his discretion, initiate a descending maneuver. Assuming that the pilot does command such a descending maneuver, the apparatus of the present invention, already operating in its pull-up mode, is adapted to automatically initiate a pull-up maneuver to clear the terrain lying beneath the aircraft. Additional means are provided to terminate the execution of the last mentioned pull-up maneuver in the event that no further vertical obstacles lie ahead of the aircraft at the moment when the aircraft reassumes a horizontal line of flight.

While the invention has been described in its preferred embodiments, its is to be understood that the words which have been used are words of description rather than of limitation and that changes within the purview of the appended claims may be made without departing from the true scope and spirit of the invention in its broader aspects.

What is claimed is:

1. In an aircraft guidance system for clearing an obstacle lying along the path of aircraft travel, apparatus including a computer adapted to receive radar data respecting said obstacle and aerodynamic data and operative to compute therefrom the constant load factor to which said aircraft would be subjected in tangentially clearing said obstacle, said computer producing a signal proportional to said computed load factor, reference load factor signal generating means, and means for comparing said computed load factor signal and said reference load factor signal and for producing a command signal upon equality therebetween.

2. In an aircraft guidance system, apparatus comprising radar means for detecting obstacles in the path of aircraft travel including means for scanning said obstacles through predetermined angles measured relative to the aircraft velocity vector, said radar means producing first and second signals respectively proportional to the ranges of said obstacles and the elevations of said obstacles as measured relative to said velocity vector, aircraft airspeed sensing means for producing a third signal proportional thereto, aircraft flight path sensing means for producing a fourth signal proportional thereto, means adapted to receive said first, second, third, and fourth signals and operative to compute therefrom the constant load factor to which said aircraft would be subjected in tangentially clearing each of said obstacles, said computer means producing a signal proportional to said computed load factors, reference load factor signal generating means, and means for comparing said computed load factor signals and said reference load factor signal and for producing a command signal upon equality therebetween.

3. In an aircraft guidance system, apparatus including a computer adapted to receive radar data respecting an obstacle lying in the aircraft flight path and aerodynamic data and operative to compute therefrom the constant load factor to which said aircraft would be subjected in tangentially clearing said obstacle, said computer producing a signal proportional to said computed load factor, reference load factor signal generating means, means for comparing said computed load factor signal and said reference load factor signal and for producing a command signal upon equality therebetween, a signal comparator having two inputs and producing an output control signal proportional to the difference between the two input signals, switching means for applying said reference load factor signal to one of said inputs of said signal comparator in response to said command signal, means for producing a fifth signal proportional to that component of aircraft acceleration acting in a plane normal to both the aircraft longitudinal axis and the aircraft pitch axis, means for applying said fifth signal to the other of said inputs of said signal comparator, and means for positioning a control surface of said aircraft, said output of said signal comparator being connected to the input of said last-named means.

4. In an aircraft guidance system, apparatus comprising radar obstacle ranging means including means for scanning said obstacle through predetermined angles measured relative to the aircraft velocity vector, said radar means producing first and second signals respectively proportional to the range of said obstacle and the elevation of said obstacle as measured relative to said velocity vector, aircraft airspeed sensing means for producing a third signal proportional thereto, aircraft flight path angle sensing means for producing a fourth signal proportional thereto, means adapted to receive said first, second, third, and fourth signals and operative to compute therefrom the constant load factor to which said aircraft would be subjected in tangentially clearing said obstacle, said computer means producing a signal proportional to said computed load factor, reference load factor signal generating means, and means for comparing said computed load factor signal and said reference load factor signal and for producing a command signal upon equality therebetween, a signal comparator having two inputs and producing an output control signal proportional to the difference between the two input signals, switching means for applying said reference load factor signal to one of said inputs of said signal comparator in response to said command signal, means for producing a fifth signal proportional to that component of aircraft acceleration acting in a plane normal to both the aircraft longitudinal axis and the aircraft pitch axis, means for applying said fifth signal to the other of said inputs of said signal comparator, and means for positioning a control surface of said aircraft, said output of said signal comparator being connected to the input of said last-named means.

5. Apparatus as defined in claim 4 wherein said radar obstacle means is adapted to scan obstacles lying above said aircraft velocity vector and to produce said second signal proportional thereto.

6. Apparatus as defined in claim 4 wherein said radar obstacle means is adapted to scan obstacles lying below said aircraft velocity vector and to produce said second signal proportional thereto.

7. Apparatus as defined in claim 4 wherein said radar obstacle means includes antenna supporting means and means for stabilizing said supporting means along said aircraft velocity vector.

8. Apparatus as defined in claim 4 wherein said radar obstacle means includes antenna supporting means and means for stabilizing said supporting means in two orthogonal axes, one of said axes being stabilized along a horizontal and the other of said axes being stabilized along said aircraft velocity vector.

9. In an aircraft guidance system, radar means for detecting obstacles including means for scanning said obstacles through predetermined angles measured relative to the aircraft velocity vector, said radar means producing first and second signals respectively proportional to the ranges of said obstacles and the elevations of said obstacles as measured relative to said velocity vector, said radar means including antenna supporting means, and means for stabilizing said supporting means in two orthogonal axes, so that one of said axes is stabilized with respect to the aircraft roll axis and the other of said axes is stabilized with respect to said aircraft velocity vector.

10. In an aircraft guidance system, apparatus comprising radar means for detecting obstacles including means for scanning said obstacles through predetermined angles measured relative to the aircraft velocity vector, said radar means producing first and second signals respectively proportional to the ranges of said obstacles and the elevations of said obstacles as measured relative to and above said velocity vector, aircraft airspeed sensing means for producing a third signal proportional thereto, aircraft flight path angle sensing means for producing a fourth signal proportional thereto, means adapted to receive first, second, third, and fourth signals and operative to compute therefrom the constant load factor to which said aircraft would be subjected in tangentially clearing each said obstacle, said computer means producing a signal proportional to said computed load factors, reference load factor signal generating means, means for comparing said computed load factor signals and said reference load factor signal and for producing a command signal upon equality therebetween, gating means adapted to receive said first and second signals and operative to produce an output signal in the absence of said first signal and in the presence of said second signal, and indicating means responsive to said output signal.

11. In an aircraft guidance system, means for signaling to the pilot that a descending maneuver may be safely initiated, said means including radar means for detecting obstacles including means for scanning said obstacles through predetermined angles measured relative to the aircraft velocity vector, said radar means producing first and second signals respectively proportional to the ranges of said obstacles and the elevations of said obstacles as measured relative to and above said velocity vector, gating means adapted to receive said first and second signals and operative to produce an output signal in the absence of said first signal and in the presence of said second signal, and indicating means responsive to said output signal.

12. In an aircraft guidance system, apparatus including a computer adapted to receive radar data respecting an obstacle and aerodynamic data and operative to compute therefrom the constant load factor to which said aircraft would be subjected in tangentially clearing said obstacle, said computer producing a signal proportional to said computed load factor, reference load factor signal generating means, means for comparing said computed load factor signal and said reference load factor signal and for producing a command signal upon equality therebetween, aircraft rate-of-climb sensing means for producing a fifth signal proportional thereto, a signal comparator having two inputs and producing an output control signal proportional to the difference between the two input signals, means adapted to receive said reference load factor signal, said command signal and said fifth signal for selectively applying said reference load factor signal to one of said inputs of said signal comparator in response to said command signal, and for disconnecting said reference load factor signal from said one of said inputs of said signal comparator when said fifth signal equals zero, means for producing a sixth signal proportional to that component of aircraft acceleration acting in a plane normal to both the aircraft longitudinal axis and the aircraft pitch axis, means for applying said sixth signal to the other of said inputs of said signal comparator, and means for positioning the control surface of said aircraft, said output of said signal comparator being connected to the input of said last-named means.

13. In an aircraft guidance system, apparatus for automatically initiating and terminating an obstacle clearance maneuver, said apparatus comprising radar means for detecting obstacles including means for scanning said obstacles through predetermined angles measured relative to the aircraft velocity vector, said radar means producing first and second signals respectively proportional to the ranges of said obstacles and the elevations of said obstacles as measured relative to said velocity vector, aircraft airspeed sensing means for producing a third signal proportional thereto, flight path angle sensing means for producing a fourth signal proportional thereto, means adapted to receive said first, second, third, and fourth signals and operative to compute therefrom the constant load factor to which said aircraft would be subjected in tangentially clearing each said obstacle, said computer means producing a signal proportional to said computed load factors, reference load factor signal generating means, means for comparing said computed load factor signals and said reference load factor signal and for producing a command signal upon equality therebetween, aircraft rate-of-climb sensing means for producing a fifth signal proportional thereto, a signal comparator having two inputs and producing an output control signal proportional to the difference between the two input signals, means adapted to receive said reference load factor signal, said command signal, and said fifth signal for selectively applying said reference load factor signal to one of said inputs of said signal comparator in response to said command signal and for disconnecting said reference load factor signal from said one of said inputs of said signal comparator when said fifth signal equals zero, means for producing a sixth signal proportional to that component of aircraft acceleration acting in a plane normal to both the aircraft longitudinal axis and the aircraft pitch axis, means for applying said sixth signal to the other of said inputs of said signal comparator, and means for positioning a control surface of said aircraft, said output of said signal comparator being connected to the input of said last-named means.

14. In an aircraft guidance system, apparatus including a computer adapted to receive radar data respecting obstacles lying along the path of aircraft travel and aerodynamic data and operative to compute therefrom the constant load factor to which said aircraft would be subjected in tangentially clearing each said obstacle, said computer producing a signal proportional to said computed load factors, said computed load factor signals having a first characteristic when angles above said velocity vector are scanned and having a second characteristic when angles below said velocity vector are scanned, means for generating first and second reference load factor signals, means for comparing said computed load factor signals having said first characteristic with said first reference load factor signal and for producing a first command signal upon equality therebetween, means for comparing said computed load factor signals having said second characteristic with said second reference load factor signal and for producing a second command signal upon equality therebetween, a signal comparator having two inputs and producing an output control signal proportional to the difference between the two input signals, switching means for applying said first reference load factor signal to one of said inputs of said signal comparator in response to said first command signal, and means for applying said second reference load factor signal to said one of said inputs of said signal comparator in response to said second command signal, means for producing a fifth signal proportional to that component of aircraft acceleration acting in a plane normal to both the aircraft longitudinal axis and the aircraft pitch axis, means for applying said fifth signal to the other of said inputs of said signal comparator, and means for positioning the control surface of said aircraft, said output of said signal comparator being connected to the input of said last-named means.

15. In an aircraft guidance system, apparatus comprising radar means for detecting obstacles including means for scanning said obstacles through predetermined angles measured relative to the aircraft velocity vector, said radar means producing first and second signals respectively proportional to the ranges of said obstacles and the elevations of said obstacles as measured relative to said velocity vector, aircraft airspeed sensing means for producing a third signal proportional thereto, aircraft flight path angle sensing means for producing a fourth signal proportional thereto, means adapted to receive said first, second, third, and fourth signals and operative to compute therefrom the constant load factor to which said aircraft would be subjected in tangentially clearing each said obstacle, said computer means producing a signal proportional to said computed load factors, said computed load factor signals having a first characteristic when angles above said velocity vector are scanned and having a second characteristic when angles below said velocity vector are scanned, means for generating first and second reference load factor signals, means for comparing said computed load factor signals having said first characteristic with said first reference load factor signal and for producing a first command signal upon equality therebetween, means for comparing said computed load factor signals having said second characteristic with said second reference load factor signal and for producing a second command signal upon equality therebetween, a signal comparator having two inputs and producing an output control signal proportional to the difference between the two input signals, switching means for applying said first reference load factor signal to one of said inputs of said signal comparator in response to said first command signal and for applying said second reference load factor signal to said one of said inputs of said signal comparator in response to said second command signal, means for producing a fifth signal proportional to that component of aircraft acceleration acting in a plane normal to both the aircraft longitudinal axis and the aircraft pitch axis, means for applying said fifth signal to the other of said inputs of said signal comparator, and means for positioning the control surface of said aircraft, said output of said signal comparator being connected to the input of said last-named means.

References Cited

UNITED STATES PATENTS 2,574,853  11/1951  Ward _____ 343—7.4
2,630,283  3/1953  Hanson _____ 343—7

RODNEY D. BENNETT, Primary Examiner

M. F. HUBLER, Assistant Examiner